(12) United States Patent
Jordan et al.

(10) Patent No.: US 12,741,224 B2
(45) Date of Patent: Sep. 22, 2026

(54) SYSTEMS AND METHODS FOR GENERATING DERIVATIVES OF NON-FUNGIBLE TOKENS FOR AN AMUSEMENT PARK ATTRACTION

(71) Applicant: Universal City Studios LLC, Universal City, CA (US)

(72) Inventors: Robert Michael Jordan, Orlando, FL (US); Gabriella Farrisi, Austin, TX (US); Gargi Deb, San Ramon, CA (US); Kristen Elizabeth Tan, Philadelphia, PA (US); Matthew Donald Dailey, Philadelphia, PA (US); Taylor Doris May Harris, New York, NY (US); Mark James Traynor, Orlando, FL (US); Howard Bruce Mall, Jr., Winter Springs, FL (US); Victor Alexander Lugo, Leesburg, FL (US); Anthony Melo, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 637 days.

(21) Appl. No.: 18/138,546

(22) Filed: Apr. 24, 2023

(65) Prior Publication Data

US 2023/0347257 A1 Nov. 2, 2023

Related U.S. Application Data

(60) Provisional application No. 63/336,108, filed on Apr. 28, 2022.

(51) Int. Cl.
*A63G 31/00* (2006.01)
*A63F 13/27* (2014.01)
(Continued)

(52) U.S. Cl.
CPC .............. *A63G 31/00* (2013.01); *A63F 13/27* (2014.09); *A63F 13/79* (2014.09); *A63G 31/16* (2013.01);
(Continued)

(58) Field of Classification Search
CPC ......... A63G 31/00; A63G 31/16; A63F 13/27; A63F 13/79; A63J 5/02; G06F 3/011; G06K 19/0723; G06K 19/0727; H04L 9/3234
See application file for complete search history.

(56) References Cited

U.S. PATENT DOCUMENTS

| | | | |
|---|---|---|---|
| 9,943,769 | B2 | 4/2018 | Comploi |
| 11,049,082 | B2 | 6/2021 | Rice |

(Continued)

FOREIGN PATENT DOCUMENTS

| | | | |
|---|---|---|---|
| WO | 2021054989 | A1 | 3/2021 |

OTHER PUBLICATIONS

Coates, Charlotte, NFTs: Non Fungible Tokens in the Attractions Industry, Blooloop—Technology, Sep. 7, 2021, 23 pages, https://blooloop.com/technology/in-depth/nfts-in-attractions/.

(Continued)

*Primary Examiner* — Audrey B. Walter
(74) *Attorney, Agent, or Firm* — Fletcher Yoder, P.C.

(57) ABSTRACT

An interactive system for an amusement park attraction includes one or more processors configured to identify a non-fungible token (NFT) possessed by a user within the amusement park attraction. The one or more processors are also configured to transform the NFT into a derivative of the NFT based on context data for the amusement park attraction. The one or more processors are further configured to instruct display of the derivative of the NFT on a display screen within the amusement park attraction.

20 Claims, 5 Drawing Sheets

(51) Int. Cl.

| | |
|---|---|
| ***A63F 13/79*** | (2014.01) |
| ***A63G 31/16*** | (2006.01) |
| ***A63J 5/02*** | (2006.01) |
| ***G06F 3/01*** | (2006.01) |
| ***G06K 19/07*** | (2006.01) |
| ***H04L 9/32*** | (2006.01) |

(52) U.S. Cl.

CPC ................. *A63J 5/02* (2013.01); *G06F 3/011* (2013.01); *G06K 19/0723* (2013.01); *G06K 19/0727* (2013.01); *H04L 9/3234* (2013.01)

(56) References Cited

U.S. PATENT DOCUMENTS

| | | | |
|---|---|---|---|
| 11,132,839 | B1 | 9/2021 | White et al. |
| 12,211,031 | B2 * | 1/2025 | Khalfan ................ H04L 9/0891 |
| 12,340,371 | B2 * | 6/2025 | Khalfan ................. G06Q 20/36 |
| 12,367,484 | B2 * | 7/2025 | Khalfan ........... G06Q 20/40145 |
| 2012/0162436 | A1 | 6/2012 | Cordell et al. |
| 2019/0143204 | A1 | 5/2019 | Aman et al. |
| 2019/0158289 | A1 | 5/2019 | Drouin et al. |
| 2019/0220634 | A1 | 7/2019 | Cossairt et al. |
| 2019/0299105 | A1 | 10/2019 | Knight et al. |
| 2021/0201336 | A1 | 7/2021 | Mallett et al. |
| 2021/0201625 | A1 | 7/2021 | Simons |
| 2021/0266523 | A1 | 8/2021 | Goergen et al. |
| 2022/0271915 | A1 * | 8/2022 | Turner .................. H04L 9/3263 |
| 2023/0195855 | A1 | 6/2023 | Mavromatis et al. |

OTHER PUBLICATIONS

Hong Kong Best Theme Park & Attractions, Ocean Park-Hong Kong, accessed Apr. 24, 2023, 4 pages, https://www.oceanpark.com.hk/en.

Cacioli, Lucas, Decentralized Theme Parks Promise Kids Virtual Prizes to Earn as They Learn, Forkast, Jun. 29, 2021, 4 pages, https://forkast.news/video-audio/decentralized-theme-park-give-away-crypto-nfts/.

Dreamy Edventure—Decentralised Theme Park, Play, Learn and Earn tokens in a NFT-powered Metaverse, accessed Apr. 24, 2023, 4 pages, https://www.dreamyedventure.com/.

Baker Kendall, Sports Tickets Meet NFTs, AXIOS-Sports, Nov. 21, 2021, 10 pages, https://www.axios.com/2021/11/19/sports-tickets-nfts-digital-bobbleheads.

PCT/US2023/020210 International Search Report and Written Opinion mailed Aug. 23, 2023.

SG Office Action for Singapore Application No. 11202407059X mailed Jun. 15, 2026.

* cited by examiner

SYSTEMS AND METHODS FOR GENERATING DERIVATIVES OF NON-FUNGIBLE TOKENS FOR AN AMUSEMENT PARK ATTRACTION

CROSS-REFERENCE TO RELATED APPLICATION

This application claims priority to and the benefit of U.S. Provisional Application No. 63/336,108, entitled "SYSTEMS AND METHODS FOR GENERATING DERIVATIVES OF NON-FUNGIBLE TOKENS FOR AN AMUSEMENT PARK ATTRACTION" and filed Apr. 28, 2022, which is incorporated by reference herein in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks may include various entertainment attractions. Some entertainment attractions may provide an interactive environment for guests. For example, the guests may view an animated character on a display screen within the interactive environment, and the guests may provide inputs that cause the animated character to move in a particular manner on the display screen within the interactive environment.

BRIEF DESCRIPTION

Certain embodiments commensurate in scope with the originally claimed subject matter are discussed below. These embodiments are not intended to limit the scope of the disclosure. Indeed, the present disclosure may encompass a variety of forms that may be similar to or different from the embodiments set forth below.

In an embodiment, an interactive system for an amusement park attraction includes one or more processors configured to identify a non-fungible token (NFT) possessed by a user within the amusement park attraction. The one or more processors are also configured to transform the NFT into a derivative of the NFT based on context data for the amusement park attraction. The one or more processors are further configured to instruct display of the derivative of the NFT on a display screen within the amusement park attraction.

In an embodiment, an interactive system for one or more amusement park attractions includes one or more processors configured to identify a non-fungible token (NFT) possessed by a user. The one or more processors are also configured to transform the NFT into a first derivative of the NFT based on first context data for a first amusement park attraction of the one or more amusement park attractions. The one or more processors are further configured to transform the NFT into a second derivative of the NFT based on second context data for a second amusement park attraction of the one or more amusement park attractions. The one or more processors are further configured to instruct display of the first derivative of the NFT and the second derivative of the NFT for visualization by the user.

In an embodiment, a method of operating an interactive system for one or more amusement park attractions includes identifying, using one or more processors, a non-fungible token (NFT) possessed by a user. The method also includes transforming, using the one or more processors, the NFT into a derivative of the NFT based on context data for a first amusement park attraction of the one or more amusement park attractions. The method further includes instructing, using the one or more processors, display of the derivative of the NFT on a first display screen within first the amusement park attraction of the one or more amusement park attractions.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
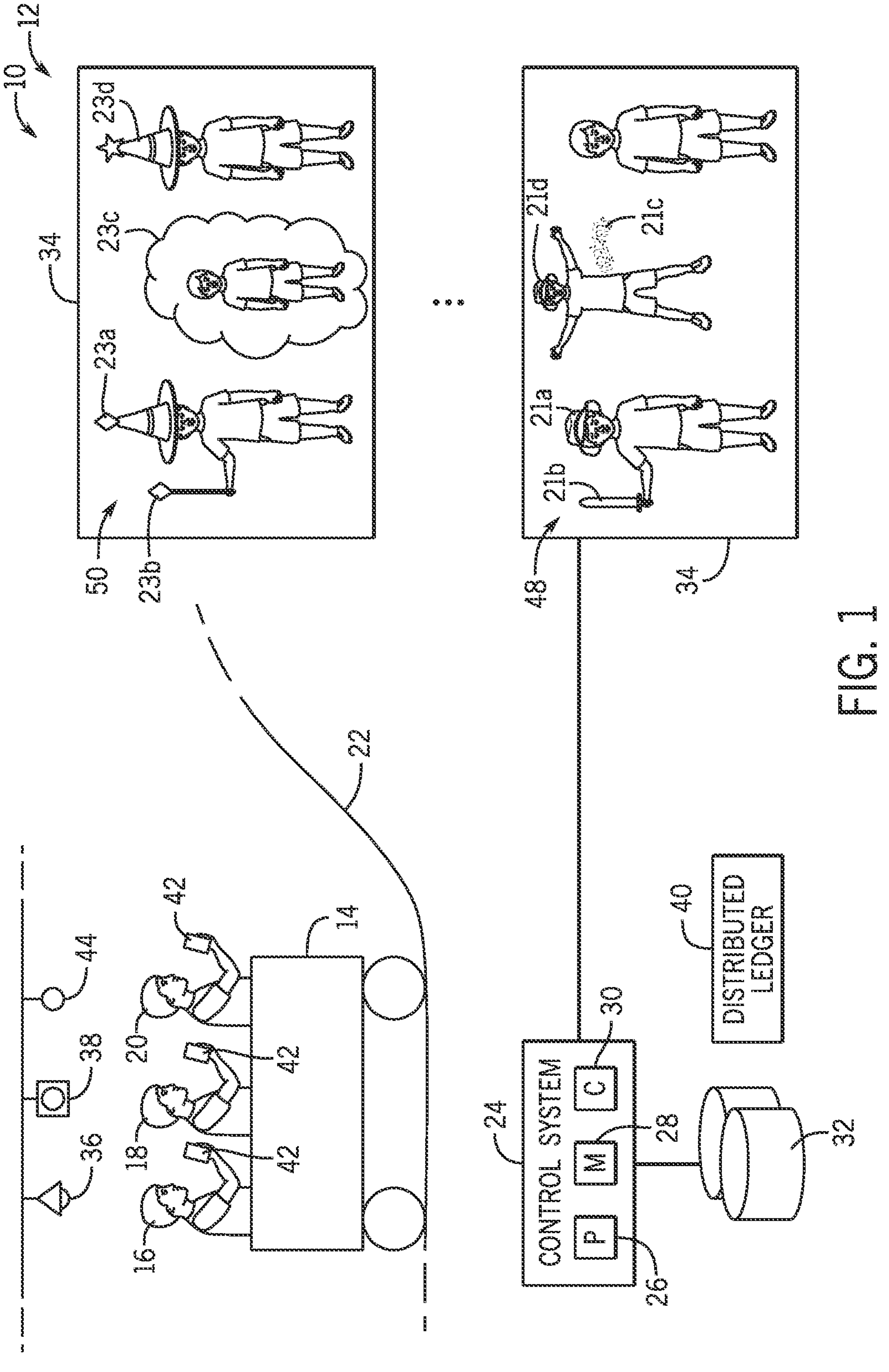
FIG. 1 is schematic diagram of an interactive system that utilizes non-fungible tokens (NFTs) within an amusement park attraction, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

Amusement parks may provide an interactive environment for guests (e.g., users). In the interactive environment, effects (e.g., images on a display screen, lights, sounds, story lines) may vary based on characteristics and/or actions of a user. For example, the interactive environment may include a display system, a lighting system, and a sound effect system that produce environmental effects, which can be changed based on a physical object (e.g., toy, wand, band) carried by the user. The physical object may be a toy with a shape of a particular action figure and may have a unique identifier (e.g., radiofrequency identification [RFID] tag, bar code) that is readable by a reader within the interactive environment. Then, the interactive environment may display images of the particular action figure as the user travels through the interactive environment. However, it is presently recognized that physical objects may have various disadvantages, such as that they may be lost, broken, and/or cumbersome to carry throughout the interactive attraction (particularly if the user would like to collect many different physical objects).

Accordingly, the present embodiments relate generally to systems and methods that utilize digital objects or tokens, such as non-fungible token (NFTs), to enhance an experience for users in the interactive environment. An NFT is a unit of data that may be stored in a distributed ledger (e.g., blockchain). The NFT is unique and/or non-interchangeable, such that a unique identity and ownership can be confirmed (e.g., verified). This may impart a feeling of ownership over the NFT in a manner that is similar to a feeling of ownership over a physical object (e.g., physical photograph or a collectable toy). However, unlike the physical object, the NFT may not be lost, broken, and/or cumbersome to carry. Indeed, one or more NFTs (e.g., any number of NFTs, such as 1, 2, 3, 4, 5, more than 10, more than 100) may be stored in a distributed ledger and accessible from a digital wallet of the user. The NFT may also have other advantages (e.g., as compared to the physical object), such as that the NFT may also be easily transferred to other users (e.g., via a digital marketplace; without meeting in person).

In an embodiment, the systems and methods create derivatives of the NFTs (e.g., transform the NFTs into derivatives) to enhance the experience for the users in the interactive environment. For example, the NFTs may encompass various digital artworks and/or digital collectible items, such as an image (e.g., an NFT image) of an accessory (e.g., hat, cape, jewelry, toy, wand, tool, trail or cloud that represents a superpower). As the user travels through the interactive environment, a control system (e.g., central control system) may detect that the user is in possession of the NFT that includes the image of the accessory. The control system may also retrieve context data (e.g., one or more algorithms), which may indicate a theme of the interactive environment (e.g., superhero, rodeo, unicorns) and/or other features of the interactive environment (e.g., color schemes; available attributes to transform the NFT). Then, the control system may create a derivative (e.g., derivative image; NFT-based image; modified or transformed version of the NFT) of the NFT. The derivative and the NFT may share one or more elements, such as a type (e.g., both are hats). However, the derivative and the NFT may also be different with respect to one or more elements, such as a color (e.g., one is blue, one is white). Then, the control system may display the derivative on the display screen in the interactive environment for visualization by the user (e.g., to appear as a fixed or dynamic, two-dimensional or three-dimensional object in a displayed scene; a sword fixed in the displayed scene or a hat worn by and that moves with an animated character through the displayed scene). The derivative of the NFT may vary during each visit to the interactive environment (e.g., such as during each visit to one amusement park attraction) and/or throughout different portions of the interactive environment (e.g., such as within different amusement park attractions that have different context data/algorithms). Thus, the systems and methods create varied, context-specific experiences for the user based on the NFTs owned by the user.

With the foregoing in mind, FIG. 1 is a schematic diagram of an interactive system 10 that utilizes non-fungible tokens (NFTs) within an amusement park attraction 12. As shown, the amusement park attraction 12 is a ride attraction that includes a ride vehicle 14 that is configured to carry one or more users, such as a first user 16, a second user 18, and a third user 20, along a path 22. However, it should be appreciated that the interactive system 10 may additionally or alternatively be implemented in any type of amusement park attraction, such as a walk-through attraction (e.g., without any ride vehicles), a conveyor attraction (e.g., with a conveyor to carry the one or more users) a motion simulator attraction (e.g., with a stationary ride vehicle to carry the one or more users), a recreational environment, a restaurant, a hotel, or the like.

The interactive system 10 includes a control system 24 that includes a processor(s) 26, a memory device(s) 28, and a communication device(s) 30. The interactive system 10 also includes one or more databases 32 that store data and one or more display screens 34 that display images (e.g., scenes with multiple images). The control system 24 may include or be communicatively coupled to the one or more databases 32, and the control system 24 may be communicatively coupled to the one or more display screens 34. The interactive system 10 may also include one or more lights 36 to provide lighting effects and/or one or more speakers 38 to provide sound effects. The control system 24 may be communicatively coupled to the one or more lights 36 and/or to the one or more speakers 38.

At least some of the one or more users may possess one or more NFTs, which are stored in a distributed ledger 40 (e.g., blockchain) and are accessible via respective digital wallets of the one or more users. In an embodiment, an application (e.g., software application) on respective user devices 42 (e.g., mobile phone, tablet, watch, toy, wand, and/or band) may include the respective digital wallets of the one or more users. Then, when a particular user device 42 is carried into the amusement park attraction 12, the control system 24 may communicate (e.g., over a network, such as a wireless network) with the particular user device 42 to access the respective digital wallet and to identify that the user associated with the particular user device 42 possesses the one or more NFTs in the respective digital wallet.

In an embodiment, the particular user device 42 may store (e.g., in a RFID tag) an address of the respective digital wallet, and then, the control system 24 may receive and utilize the address to access the respective digital wallet and to identify that the user associated with the particular user device 42 possesses the one or more NFTs in the respective digital wallet. In an embodiment, one or more sensors 44 may collect sensor data and provide the sensor data to the control system 24. Then, the control system 24 may process the sensor data to identify respective user profiles (e.g., user accounts) associated with the one or more users. Each of the user profiles may include respective park visit history, transaction history, achievements and scores, an address for a digital wallet, and the like. Then, the control system 24 may utilize the address for the digital wallet to access the respective digital wallet and to identify that the user possesses the one or more NFTs in the respective digital wallet. In such cases, the one or more sensors 44 may be cameras, facial recognition cameras, motion characteristic sensors, identity sensors, or the like. The one or more sensors 44 may detect one or more identifying characteristics of the user, such as body temperature, gait, posture, facial structure, skeletal structure, speech, or the like. The one or more sensors 44 may capture image(s) of the user(s), which may then be displayed for visualization by the user(s). The one or more sensors 44 may be installed at various locations in the amusement park attraction 12.

Regardless of the techniques used to identify that the one or more users possess the one or more NFTs, the interactive system 10 may use the one or more NFTs to provide entertainment to the one or more users while the one or more users are within the amusement park attraction 12. In an embodiment, with reference to a first displayed scene 48, the control system 24 may instruct the display screen 34 to display at least some of the one or more NFTs. For example, if the first user 16 possesses a first NFT 21*a* that encompasses a first image of a baseball cap with a red stripe and a second NFT 21*b* that encompasses a second image of a baseball bat, then the control system 24 may instruct the display screen 34 to display a first animated character wearing the baseball cap with the red stripe and carrying the baseball bat. Similarly, if the second user 18 possesses a third NFT 21*c* that encompasses a third image of a gold trail and a fourth NFT 21*d* that encompasses a fourth image of a baseball cap with a blue stripe, then the control system 24 may instruct the display screen 34 to display a second animated character followed by the gold trail and wearing the baseball cap with the blue stripe. Furthermore, if the third user 20 does not possess any NFTs, the control system 24 may instruct the display screen to display a third animated character without any accessories or other add-ons based on NFTs. In some embodiments, the animated character(s) may be a representation of the user(s) or even an image of the user(s) obtained via the one or more sensors 44 (e.g., a camera or video recorder) and displayed (e.g., essentially in real time) with a dynamically adjusted two-dimensional or three-dimensional representation of one or more of the NFTs (e.g., a hat appearing to be positioned on the user's head and moving along with the user).

In an embodiment, the interactive system 10 may create a derivative (e.g., derivative image; NFT-based image; modified or transformed version of the NFT) for some or all of the one or more NFTs. The derivative and its corresponding NFT may share one or more elements or attributes, such as a type (e.g., both are hats). However, the derivative and its corresponding NFT may also be different with respect to one or more elements or attributes, such as a color (e.g., one is blue, one is white). The derivative may also include embellishments (e.g., added elements) as compared to its corresponding NFT, such as a topper (e.g., the derivative includes the topper, the NFT does not).

For show/entertainment purposes, the derivative may replace the corresponding NFT (e.g., the derivative and its corresponding NFT are not simultaneously displayed together; only the derivative, and never its corresponding NFT, are displayed in the amusement park attraction 12). However, it is possible that the derivative may be displayed in addition to the corresponding NFT (e.g., the derivative and its corresponding NFT are simultaneously displayed together or are displayed at different times in the amusement park attraction 12). In an embodiment, the derivative may be displayed at an end portion of the amusement park attraction 12 (e.g., at a conclusion of a ride cycle and/or at an exit of the amusement park attraction 12), while the corresponding NFT is displayed at a beginning portion of the amusement park attraction 12 (e.g., at a start of a ride cycle and/or at an entrance of the amusement park attraction 12). In an embodiment, the control system 24 may create the derivative and then mint the derivative as a new NFT for the user. In such cases, the control system 24 may display the derivative (e.g., on the display screen 34 and/or on the user device 42) and request input from the user to confirm that they would like to mint the derivative as the new NFT for the user, and there may be a fee that is charged/paid prior to minting the new derivative as the new NFT for the user. In this way, the user may be able to collect additional NFTs and/or have verifiable digital data/images as souvenirs from their visit to the amusement park attraction 12.

In an embodiment, with reference to a second displayed scene 50, the control system 24 may instruct the display screen 34 to display one or more derivatives of the one or more NFTs. For example, if the first user 16 possesses the first NFT 21*a* that encompasses the first image of the baseball cap with the red stripe and the second NFT 21*b* that encompasses the second image of the baseball bat, then the control system 24 may generate a first derivative 23*a* of the first NFT 21*a* and a second derivative 23*b* of the second NFT 21*b*. The first derivative 23*a* of the first NFT 21*a* may be a pointed hat with a red stripe and a diamond topper, and the second derivative 23*b* of the second NFT 21*b* may be a wand with a diamond topper. Then, the control system 24 may instruct the display screen 34 to display the first derivative 23*a* and the second derivative 23*b*, such as by displaying the first animated character wearing the pointed hat with the red stripe and the diamond topper, as well as carrying the wand with the diamond topper.

Similarly, if the second user 18 possesses the third NFT 21*c* that encompasses the third image of the gold trail, then the control system 24 may generate a third derivative 23*c* of the third NFT 21*c*. The third derivative 23*c* of the third NFT 21*c* may be a gold cloud, and then, the control system 24 may instruct the display screen 34 to display the third derivative 23*c*, such as by displaying the second animated character surrounded by the gold cloud. Furthermore, if the third user 20 possesses the fourth NFT 21*d* that encompasses the fourth image of the baseball cap with the blue stripe, then the control system 24 may generate a fourth derivative 23*d* of the fourth NFT 21*d*. The fourth derivative 23*d* of the fourth NFT 21*d* may be a pointed hat with a blue stripe and a star topper. Then, the control system 24 may instruct the display screen 34 to display the fourth derivative 23*d*, such as by displaying the third animated character wearing the pointed hat with the blue stripe and the star topper.

In an embodiment, the first displayed scene 48 may be displayed during a first pass (e.g., first visit or ride cycle) through the amusement park attraction 12, and the second displayed scene 50 may be displayed during a second pass (e.g., second visit or ride cycle) through the amusement park attraction 12. Furthermore, as shown, the fourth NFT **21*d* is associated with the second animated character that corresponds to the second user 18 in the first displayed scene 48 and with the third animated character that corresponds to the third user 20 in the second displayed scene 50. This change is intended to represent and show that ownership of the NFTs may change, such as due to being purchased, traded, and/or otherwise transferred. For example, in this case, the fourth NFT 21*d* may have been transferred from the second user 18 to the third user 20 after the first pass through the amusement park attraction 12 and prior to the second pass through the amusement park attraction 12**.

In an embodiment, multiple derivatives may be generated for a single NFT (e.g., at different times). In an embodiment, multiple derivatives may be generated for a single NFT (e.g., at one time). The multiple derivatives for the single NFT may be the same or different (e.g., all identical or at least some with different attributes). In any case, this may enable the user to view different derivatives based on the single NFT during different visits to the amusement park attraction 12 and/or during visits to other amusement park attractions. This also may enable a group of users (e.g., a family; all users in the ride vehicle 14 or a set of ride vehicles that travel together along the path 22) to benefit from any NFTs possessed by the group of users. For example, if the first user 16 possesses the first NFT **21*a* that encompasses the first image of the baseball cap with the red stripe and the second NFT 21*b* that encompasses the second image of the baseball bat, then the control system 24 may generate multiple first derivatives of the first NFT 21*a* and/or multiple second derivatives of the second NFT 21*b*. The multiple first derivatives of the first NFT 21*a* may be multiple pointed hats, and/or the multiple second derivatives of the second NFT 21*b* may be multiple wands. Then, the control system 24 may instruct the display screen 34 to display the multiple first derivatives and/or the multiple second derivatives, such as by displaying the first animated character, the second animated character, and the third animated character (or all animated characters for all users in the group) each wearing one of the multiple pointed hats, as well as carrying one of the multiple wands. Thus, even if the third user 20 does not possess an NFT of a hat, the third animated character associated with the third user 20 may wear a hat as long as another user in the group possesses an NFT of a hat. This may provide an element of surprise and entertainment, as the user may be presented with different, unexpected NFTs and/or derivatives during each pass through the amusement park attraction 12** (e.g., depending on their group).

The animated characters may be avatars that represent and/or are associated with respective users. Thus, the first animated character may represent and/or be associated with the first user 16, the second animated character may represent and/or be associated with the second user 18, and the third animated character may represent and/or be associated with the third user 20. The avatars may be generated by the control system 24, such as randomly, based on the sensor data from the one or more sensors 44, and/or based on the user profiles. In an embodiment, the avatar(s) associated with each user are accessible and viewable by the user via the application on their user device 42. For example, the user may make selections to move through a menu to view and/or to select the avatar (e.g., among a list of multiple avatars that are available to the user; combine elements to form the avatar), and then the user may recognize the avatar as their own when the avatar is displayed on the display screen 34.

In an embodiment, the avatar is also an NFT that is stored on the distributed ledger 40 and is accessible via the respective digital wallet of the user. Furthermore, the control system 24 may be configured to generate an avatar derivative of the avatar. For example, if the first user 16 possesses a first avatar NFT that encompasses a first avatar image of the first animated character with brown eyes, then the control system 24 may generate a first avatar derivative of the first avatar NFT. The first avatar derivative of the first avatar NFT may be the first animated character with gold eyes (and/or other varied/changed attribute(s)). Then, the control system 24 may instruct the display screen 34 to display the first avatar derivative, such as by displaying the first animated character with the gold eyes. In an embodiment, the one or more NFTs and/or the one or more derivatives may not be displayed on the display screen 34 as accessories for one or more avatars, but instead may be displayed in other ways. For example, the one or more NFTs and/or the one or more derivatives may be displayed on the display screen 34 as accessories for one or more non-avatar animated characters (e.g., popular super heroes or cartoon characters associated with the amusement park attraction 12) and/or as elements within a displayed scene (e.g., projectiles; trees; buildings; artwork on walls).

The control system 24 may also cause various other effects based on the one or more NFTs possessed by the one or more users. For example, the control system 24 may control the light 36, the speaker 38, and/or the display screen 34 to provide outputs based on the one or more NFTs (e.g., characteristics of the NFTs or the derivatives of the NFTs) possessed by the one or more users. For example, upon identifying the second NFT **21*b* of the baseball bat and/or as the second NFT 21*b* of the baseball bat is shown on the display screen 34, the control system 24 may instruct the speaker 38 to play sounds of cheering crowds similar to sounds that would be expected at a baseball game. The control system 24 may also provide the outputs based on the one or more derivatives. For example, upon identifying the second derivative 23*b* is the wand with the diamond topper and/or as the second derivative 23*b* of the wand with the diamond topper is shown on the display screen 34, the control system 24 may instruct the speaker 38 to play sounds that suggest magic and spell-casting abilities. Similar effects may be provided with the light 36, such as casting a gold light as the first avatar derivative with the gold eyes is shown on the display screen 34. In this way, the interactive system 10** may provide an immersive, dynamic experience to the one or more users.

The processor 26 may include a microprocessor, which may execute software to generate derivatives, control the display screen 34, and/or control other features of the interactive system 10. The processor 26 may include multiple microprocessors, one or more "general-purpose" microprocessors, one or more special-purpose microprocessors, and/or one or more application specific integrated circuits (ASICs), or some combination thereof. For example, the processor 26 may include one or more reduced instruction set computer (RISC) processors. The memory device 28 may include volatile memory, such as random access memory (RAM), and/or nonvolatile memory, such as read-only memory (ROM). The memory device 28 may store information, such as control software, look up tables, configuration data, communication protocols, or the like.

For example, the memory device 28 may store processor-executable instructions including firmware or software for the processor 26 to execute, such as instructions for generating derivatives, controlling the display screen 34, and/or controlling other features of the interactive system 10. In an embodiment, the memory device 28 is a tangible, non-transitory, machine-readable media that may store machine-readable instructions for the processor 26 to execute. The memory device 28 may include ROM, flash memory, hard drives, any other suitable optical, magnetic, or solid-state storage media, or a combination thereof. The communication device 30 may facilitate communication (e.g., wireless communication) with other components, such as the one or more databases 32, the display screen 34, the distributed ledger 40, and/or the user devices 42.

As noted herein, multiple derivatives may be created for a single NFT, such as a different derivative during each visit to the amusement park attraction 12 (e.g., such as during sequential visits to the ride attraction) and/or throughout different portions of the interactive environment (e.g., such as within different amusement park attractions and/or within different portions of the amusement park attraction 12). To create variations in the derivatives, the interactive system 10 may reference context data (e.g., algorithms), such as from the one or more databases 32. The context data may include one or more algorithms, and the context data may relate to a theme of the amusement park attraction 12 (e.g., superhero, rodeo, unicorns) and/or other features of the amusement park attraction 12 (e.g., color schemes; available attributes to transform the NFT). Then, the control system 24 may create the derivative of the NFT based on the context data.

Figure 2:
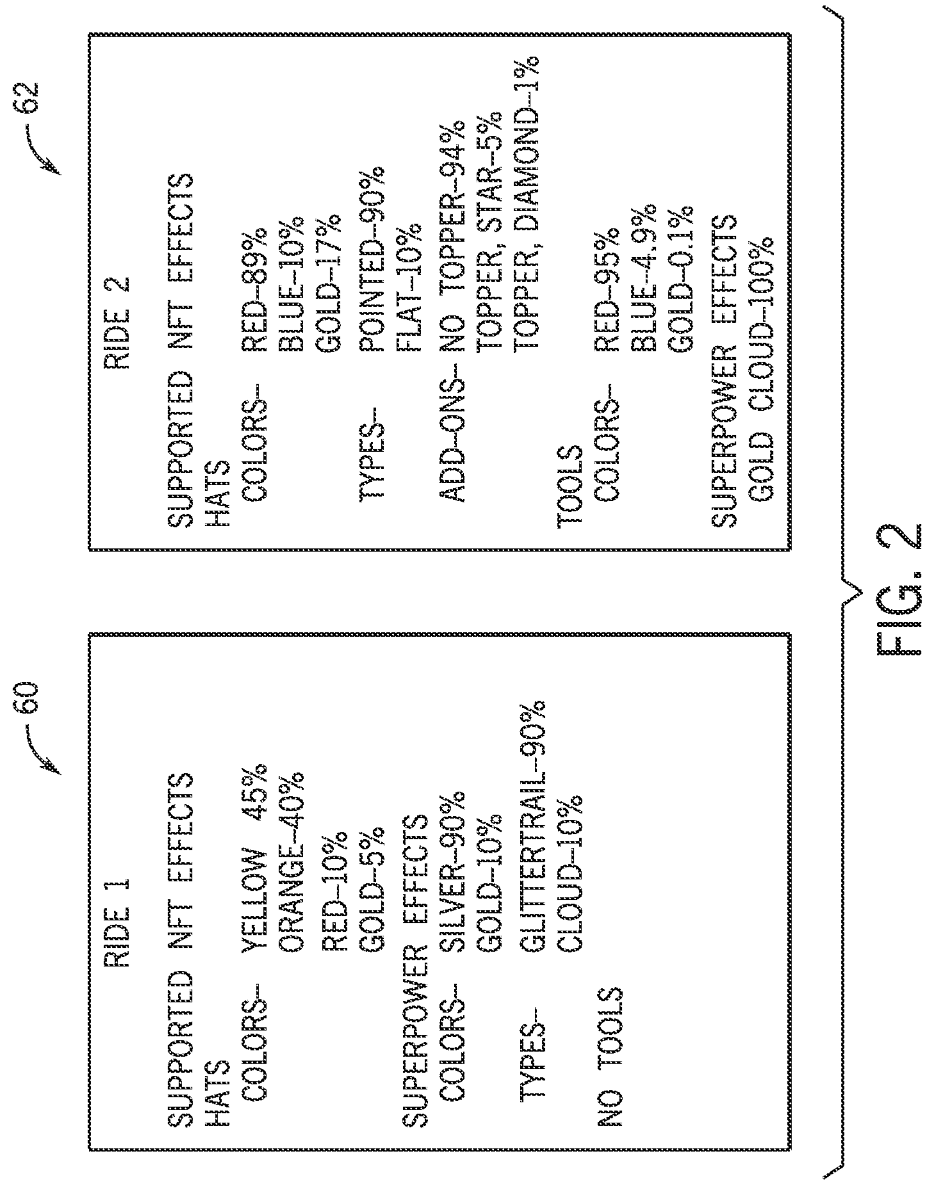
FIG. 2 illustrates examples of attributes that are available to create derivatives based on NFTs within different amusement park attractions, in accordance with an aspect of the present disclosure.

FIG. 2 illustrates examples of attributes that are available to transform the NFT within different amusement park attractions, in accordance with an aspect of the present disclosure. As shown, a first ride attraction ("RIDE 1") may have first context data 60 that includes a first list of supported NFT effects, and a second ride attraction ("RIDE 2") may have second context data 62 that includes a second list of supported NFT effects. The NFT effects may refer to types of NFTs (e.g., types of accessories, such as hats, other clothing, tools, superpowers, projectiles) that a control system is configured to process to create derivatives to display as the users travel through the first ride and the second ride, respectively.

For example, the first context data 60 indicates that NFTs of hats are supported and that the control system of the first ride attraction is configured to process the NFTs of hats to create derivatives. Additionally, the first context data 60 sets rules (e.g., percentages; probabilities; rarity) related to attributes of the derivatives. In this case, the first context data 60 sets rules that 45 percent of the derivatives of the NFTs of hats will be yellow in color, 40 percent of the derivatives of the NFTs of hats will be orange in color,C 10 percent of the derivatives of the NFTs of hats will be red in color, and 5 percent of the derivatives of the NFTs of hats will be gold in color (e.g., percentages of the derivatives of the NFTs of hats that are displayed on a display screen in the first ride attraction). Thus, the users that possess the NFTs of hats (or are in groups of users that possess the NFTs of hats) will be most likely to view their animated characters with yellow hats or orange hats (e.g., common hats), and may be pleasantly surprised and excited when their animated characters appear with red hats or gold hats (e.g., rare and ultra-rare hats, respectively) as they experience the first ride attraction.

Similarly, the first context data 60 sets rules that 90 percent of derivatives of the NFTs that represent superpowers will be silver in color and that 10 percent of derivatives of the NFTs that represent superpowers will be gold in color. The first context data 60 may also set rules that 90 percent of derivatives of the NFTs that represent superpowers will be a glitter trail and that 10 percent of derivatives of the NFTs that represent superpowers will be clouds. Thus, the users that possess the NFTs that represent superpowers (or are in groups of users that possess the NFTs that represent superpowers) will be most likely to view their animated characters with silver glitter trails (e.g., common superpowers), and may be pleasantly surprised and excited when their animated characters appear with a gold cloud (e.g., ultra-rare superpower) as they experience the first ride attraction. As shown, the first context data 60 may also indicate that the first ride attraction does not accept or support any NFTs of tools (e.g., does not create derivatives of NFTs of tools).

The second context data 62 may be different than the first context data 60. This may be helpful to provide relevant derivatives, such as relevant derivatives that are aligned with respective themes of the different amusement park attractions. This may also be helpful to provide more varied experiences for the users as they visit the multiple different amusement park attractions. Indeed, one or more attributes (e.g., yellow color) and/or derivatives (e.g., yellow hat) that are available in the first amusement park attraction may not be available in the second amusement park attraction, and vice versa. For example, a single NFT may be transformed into a derivative (e.g., yellow hat) in the first amusement park attraction, but the same single NFT cannot be transformed into the same derivative (e.g., cannot be transformed into a yellow hat) in the second amusement park attraction.

As shown, the second context data 62 indicates that NFTs of hats are supported and that the control system of the second ride attraction is configured to process the NFTs of hats to create derivatives. Additionally, the second context data 62 sets rules related to attributes of the derivatives. In this case, the second context data 62 sets rules that 89 percent of the derivatives of the NFTs of hats will be red in color, 10 percent of the derivatives of the NFTs of hats will be blue in color, and 1 percent of the derivatives of the NFTs of hats will be gold in color (e.g., percentages of the derivatives of the NFTs of hats that are displayed on a display screen in the second ride attraction). The second context data 62 also sets rules that 90 percent of the derivatives of the NFTs of hats will be pointed and that 10 percent of the derivatives of the NFTs of hats will be flat. The second context data 62 also sets rules that 94 percent of the derivatives of the NFTs of hats will not have a topper (e.g., embellishment or add-on element), 5 percent of the derivatives of the NFTs of hats will have a star topper, and that 1 percent of the derivatives of the NFTs of hats will have a diamond topper. Thus, the users that possess the NFTs of hats (or are in groups of users that possess the NFTs of hats) will be most likely to view their animated characters with red, pointed hats with no topper (e.g., common hats), may be pleasantly surprised and excited when their animated characters appear with blue pointed hats with a star topper (e.g., rare hats), and may be even more pleasantly surprised and excited when their animated characters appear with gold flat hats with a diamond topper (e.g., ultra-rare hats) as they experience the second ride attraction.

Similarly, the second context data 62 sets rules that 95 percent of derivatives of the NFTs of tools (e.g., a hammer or shovel) will be red in color, 4.9 percent of derivatives of the NFTs of tools will be blue in color, and that 0.1 percent of derivatives of the NFTs of tools will be gold in color. Thus, the users that possess the NFTs of tools (or are in groups of users that possess the NFTs of tools) will be most likely to view their animated characters with red tools (e.g., common tools), and may be pleasantly surprised and excited when their animated characters appear with a gold tool (e.g., ultra-rare tool) as they experience the second ride attraction. As shown, the second context data 62 may also indicate that the second ride attraction supports NFTs that represent superpowers, but that all derivatives of the NFTs that represent superpowers will be displayed as a gold cloud (e.g., surrounding the animated character). In some cases, the amusement park attractions may support derivatives of some NFTs and also use of other NFTs themselves (and not derivatives of the other NFTs). For example, the first context data 60 may indicate that the second ride attraction supports various derivatives of hats and superpowers; however, for tools, only the NFTs themselves (e.g., the NFT is an image of a particular tool, and the image of the particular tool is displayed in the amusement park attraction).

It should be appreciated that the context data for the multiple different amusement park attractions, such as the first context data 60 for the first ride attraction and the second context data 62 for the second ride attraction, may be made available to the users. For example, the users may utilize their user devices 42 shown in FIG. 1 to view the context data (e.g., via an application on a mobile phone). However, the users may view the context data on kiosks positioned at the amusement park attractions and/or via any other suitable device. In an embodiment, the context data may be unavailable (e.g., hidden) from the users; however, the users may glean a rarity based on the derivatives that they view as they travel through the amusement park attractions (e.g., the users observe a lot of red pointed hats and very few blue pointed hats) and/or based on perceptions associated with certain elements (e.g., gold is perceived as high value and rare; blue matches a color of a popular super hero character in the amusement park attraction). In an embodiment, the context data may change over time (e.g., day to day, year to year, season to season) so that certain elements are common during one visit and are rare during another visit. It should be appreciated that the rules may not be percentages, but instead may be a fixed number per time period (e.g., five gold hats per day, and a remainder of the hats are one or more other colors). Furthermore, there may not be separate context data for each amusement park attraction, but instead one set of context data for multiple amusement park attractions in a theme park (e.g., shared between multiple amusement park attractions in the theme park) and/or multiple sets of context data for each amusement park attraction (e.g., different sets of context data for different portions of one amusement park attraction, such as one set at a first portion of a path and another set at a second portion of the path).

In an embodiment, the control system may assign the elements randomly to create the derivatives (e.g., via a random selection generator). Thus, it is possible that the user may receive a same derivative over and over again (e.g., during different visits) and/or that multiple users in one ride vehicle (or even all users in one ride vehicle) may receive the same derivative. However, a number of available variations in the elements may make this duplication and/or repetition unlikely.

In an embodiment, the control system may assign the elements in a non-random and/or ordered manner, such as by assigning a number of first elements (e.g., 45 yellow hats), a number of second elements (e.g., 40 orange hats), a number of third elements (e.g., 10 red hats), and a number of fourth elements (e.g., 5 gold hats) on a rotating basis and taking into account the rules (e.g., respective percentages; one gold hat for every 20 hats of other colors). In an embodiment, the control system may use data (e.g., sensor data from the one or more sensors 44, such as sensor data that indicates a number of users in a group of users) to assign the elements in a manner that provides variation within the group of users (e.g., within one ride vehicle). For example, each user in the group of users may have a different derivative formed of different elements or different combinations of elements (e.g., types, colors, and/or shapes).

In an embodiment, the control system may track the derivatives for each user over time (e.g., via a block chain) to create a history of derivatives for the user, such as by adding the derivatives to the user profile for the user and/or logging the derivatives in the one or more databases. The control system may access the history of derivatives for the user and may assign the attributes based on the history of derivatives for the user and the availability of attributes for the supported NFT effects of the amusement park attraction. For example, the history of derivatives may indicate that the user has experienced a red pointed hat and a red tool during a first visit, and a gold pointed hat and a blue tool during a second visit. For one or more NFTs possessed by the user during a third visit, the control system may identify supported NFT effects that have not been presented to the user during prior visits and/or are different than a most recent visit(s). Thus, the control system may assign a blue flat hat and a gold tool during the third visit to facilitate variation in the derivatives that are presented to the user over time.

In an embodiment, the control system may consider other factors to assign derivatives, such as a number of prior visits to the amusement park attraction, prior achievements, prior purchases, a time of ownership of the corresponding NFT, a number of prior visits to the amusement park attraction while having ownership of the corresponding NFT, a combination of NFTS owned by the user, and the like. For example, the user may be more likely to be assigned a rare or an ultra-rare element (instead of a common element) after reaching a threshold number of prior visits, after completing a particular ride attraction, and/or after purchasing a particular souvenir or meal. As another example, the user may be more likely to be assigned a rare or an ultra-rare element (instead of a common element) after reaching a threshold time of ownership of the corresponding NFT, a threshold number of prior visits while having ownership of the corresponding NFT, and/or if the user owns certain combinations of NFTs (e.g., a hat and a tool and a superpower). Furthermore, the user may be more likely to be assigned a rare or an ultra-rare element (instead of a common element) after gaining ownership of a particular high-value NFT, such as an NFT that represents a gold cloud. With reference to FIG. 2, it should be appreciated that the context data may set rules within an algorithm for any of a variety of attributes for any of a variety of accessories (e.g., main color, accent color, accent type, shape, and/or embellishments for hats, other clothing, jewelry, tools, superpowers, projectiles). With reference to FIGS. 1 and 2, it should be appreciated that the second displayed scene 50 on the display screen 34 may be based on the NFTs owned by the first user 16, the second user 18, and the third user 20, as well as the second context data 62 for the amusement park attraction 12.

In an embodiment, the control system may implement artificial intelligence to dynamically transform the NFTs into the derivatives. For example, the control system may implement one or more machine-learning algorithms that are trained on context data or a respective brand guide (e.g., art style) for the amusement park attraction 12. Indeed, the one or more machine-learning algorithms may be trained on respective context data or respective brand guides for multiple different amusement park attractions. Then, the control system may use the one or more machine-learning algorithms to create the derivatives, such as via shader magic (e.g., vertex, pixel, tessellation, and compute shader). For example, a key NFT (e.g., an image of a key) may be transformed into a first derivative that appears as a key with a first color combination and a first shape in the amusement park attraction 12, but also a key with a second color combination and a second shape in another amusement park attraction.

It should also be appreciated that the control system may additionally or alternatively implement the techniques disclosed herein with motion and/or sound profiles. For example, a motion profile NFT may define a particular motion (e.g., a hand wave; a dance; a gesture). The control system may access the motion profile NFT and create a derivative of the motion profile NFT based on the context data. For example, an animated character (e.g., robot) may move according to the motion profile NFT and/or according to the derivative of the motion profile NFT based on the context data. In this way, the motion profile NFT may cause context-specific motions of the animated characters. Similarly, a sound profile NFT may define a particular sound (e.g., a song; a sound effect; a spoken phrase; a voice). The control system may access the sound profile NFT and create a derivative of the sound profile NFT based on the context data. For example, an animated character (e.g., robot) may speak according to the sound profile NFT and/or according to the derivative of the sound profile NFT based on the context data. In this way, the sound profile NFT may cause context-specific sounds of the animated characters. In such cases, the derivatives may be created using any of the techniques disclosed herein (e.g., randomly, non-random selection, based on rules and rarity levels). Indeed, the NFT may encompass any data payload in the form of a specific code or algorithm for the digital artwork, the motion profile, the voice profile, and so on. In some cases, the data payload may be unique to the NFT and/or may be included during minting of the NFT (e.g., based on an input from the user). Thus, a particular show performed in the amusement park attraction 12 may be achievable (e.g., only achievable) by accessing the data payload of the NFT.

Figure 3:
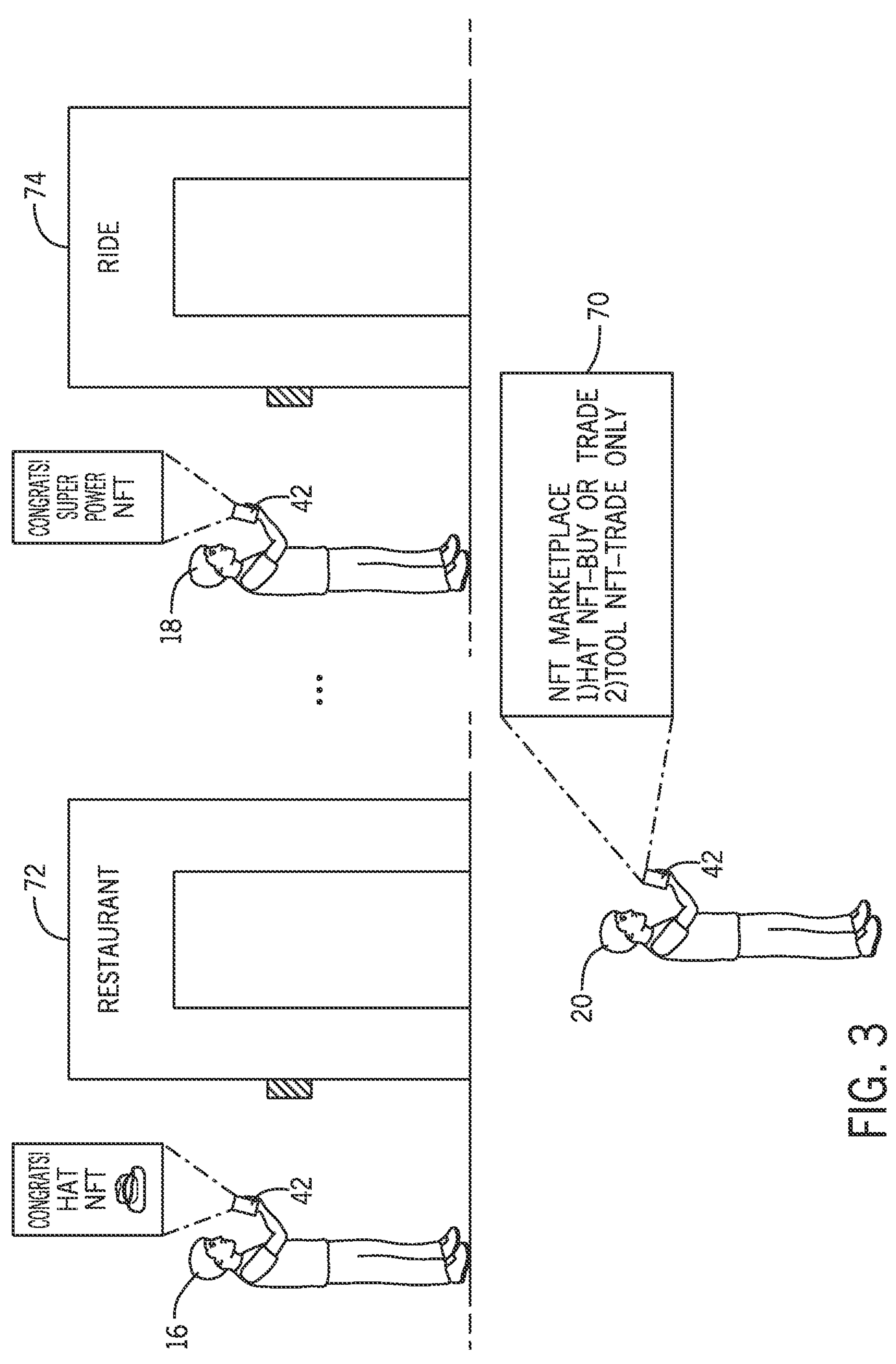
FIG. 3 illustrates users collecting NFTs at different locations and/or transferring NFTs via an NFT marketplace for use in the different amusement park attractions, in accordance with an aspect of the present disclosure.

FIG. 3 illustrates examples users collecting NFTs and/or transferring NFTs via an NFT marketplace 70 for use in the different amusement park attractions, in accordance with an aspect of the present disclosure. As shown, one or more users, such as the first user 16 and/or the second user 18, may travel to various locations (e.g., physical locations) to collect the NFTs. In an embodiment, the one or more users may use their respective user devices 42 to view a map that shows the various locations and/or details about the NFTs that are available at each of the various locations. Then, when the one or more users reach a particular one of the various locations, the one or more users may use their respective user devices to scan a scannable code (e.g., a quick response [QR] code, a bar code, an alphanumeric code) and/or otherwise log their presence at the particular one of the various locations (e.g., via a global positioning monitoring system; via communication between an RFID tag and a reader) to enable a control system to grant one or more NFTs to the user. For example, the map may guide the first user 16 to a first location 72 (e.g., a restaurant), and the first user 16 may be granted ownership of an NFT of a hat by scanning the scannable code on a wall of the restaurant, on a receipt and/or a container for a food item purchased at the restaurant, or the like. Similarly, the map may guide the second user 18 to a second location 74 (e.g., a ride attraction), and the second user 18 may be granted ownership of an NFT of a superpower by scanning the scannable code on a wall of a building that houses the ride attraction and/or on a ride vehicle within the ride attraction. The first user 16 and/or the second user 18 may obtain other NFTs (e.g., the second user 18 visits the first location 72 to obtain an NFT of a hat; any number of other NFTs, such as 1, 2, 3, 4, 5, more than 10, more than 100). It should be appreciated that the NFTs may each have respective levels of rarity and/or may be unique.

The one or more users, including the second user 18 and the third user 20, may have access to the NFT marketplace 70. For example, the second user 18 may decide that they would like to transfer their NFT of the hat to another user, and the second user 18 may list their NFT of the hat on the NFT marketplace 70. The third user 20 may decide that they would like to obtain an NFT of a hat so that they are able to view the NFT of the hat and/or derivatives of the NFT of the hat on future visits to amusement park attractions. As shown, the third user 20 may access the NFT marketplace 70, such as via an application on their user device 42. The third user 20 may provide a selection input at their user device 42 to buy the NFT of the hat (e.g., for currency, such as digital and/or real currency) or to trade for the NFT of the hat (e.g., if the third user 20 has an acceptable NFT to trade). With reference to FIGS. 1 and 3, it should be appreciated that the second displayed scene 50 on the display screen 34 may be based on the NFTs owned by the first user 16, the second user 18, and the third user 20 after transfer of the NFT of the hat from the second user 18 to the third user 20 via the NFT marketplace 70.

Figure 4:
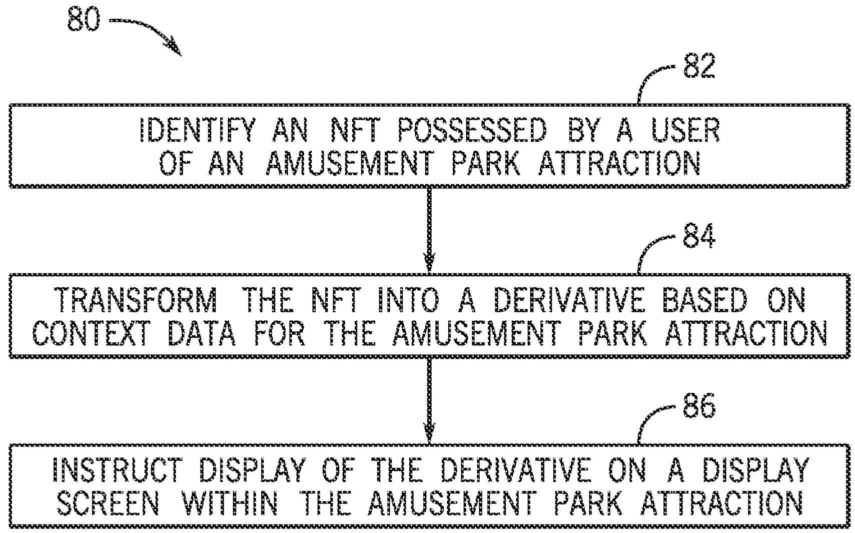
FIG. 4 is a block diagram of a method of utilizing NFTs within an amusement park attraction, in accordance with an aspect of the present disclosure.

FIG. 4 is a block diagram of a method 80 for utilizing NFTs within an amusement park attraction, in accordance with an aspect of the present disclosure. The method 80 includes various steps represented by blocks. It should be noted that the method 80 may be performed as an automated procedure by a control system, such as the control system 24 of FIG. 1. Although the flow chart illustrates the steps in a certain sequence, it should be understood that the steps may be performed in any suitable order and certain steps may be carried out simultaneously, where appropriate. Further, certain steps or portions of the method 80 may be performed by separate systems or devices.

In block 82, the control system may identify an NFT possessed by a user of an amusement park attraction. The NFT may be stored in a distributed ledger (e.g., blockchain) and is accessible via a digital wallet of the user. For example, an application (e.g., software application) on a user device (e.g., mobile phone, tablet, watch, toy, wand, and/or band) associated with the user may include the digital wallet of the user. In an embodiment, when the user device is carried into the amusement park attraction, the control system may communicate (e.g., over a network, such as a wireless network) with the user device to access the digital wallet and to identify that the user associated with the user device possesses the NFT. The control system may utilize various other techniques to identify the NFT possessed by the user of the amusement park attraction. For example, in some cases, the user may present a code (e.g., a QR code, a bar code, an alphanumeric code) to a scanner (e.g., imager or camera) of the system to enable the system to retrieve the digital wallet of the user.

In block 84, the control system may transform the NFT into a derivative based on context data for the amusement park attraction. The context data may indicate a theme of the amusement park attraction 12 (e.g., superhero, rodeo, unicorns) and/or other features of the amusement park attraction 12 (e.g., color schemes; available attributes to transform the NFT). The context data may include a list of supported NFT effects and may set rules (e.g., percentages; probabilities; rarity) related to attributes that may be included in the derivative. For example, the rules may specify that 90 percent of derivatives of NFTs for hats will be pointed hats and that 10 percent of derivatives of the NFTs for hats will be flat hats. The control system may assign the attributes to create the derivative randomly and/or in a non-random manner. In an embodiment, the control system may assign the attributes to provide variation in respective derivatives for users in a group and/or over multiple visits by the user. In an embodiment, the control system may assign the attributes based on other factors, such as achievements of the user.

In block 86, the control system may instruct display of the derivative of the NFT on a display screen within the amusement park attraction. The derivative of the NFT may be shown as an accessory that is worn and/or carried by an avatar of the user. However, the derivative of the NFT may be shown in other ways, such as worn and/or carried by a superhero character and/or as a projectile moving through a virtual environment shown on the display screen, for example. In any case, the user may be able to view the NFT in their digital wallet and then be presented with the derivative of the NFT in the amusement park attraction, which may provide for an element of surprise and excitement that may not be provided my merely displaying the NFT itself. However, as noted above, the control system may also instruct display of the NFT itself (e.g., in certain circumstances, according to the context data).

Advantageously, the present embodiments store data as NFTs, which are unique and verifiable. Additionally, the control system receives and processes the data (e.g., using one or more algorithms) to transform the NFTs into context-specific derivatives (e.g., images that are different than the NFTs) to provide context-specific shows within amusement park attractions. It should be appreciated that the control system may employ and utilize stored data that is not stored as NFTs, such as an image, a motion profile, and/or a sound profile stored in association with a user in a storage device of a computing system in the amusement park, a cloud computing system, a remote computing system, a portable object, or any other suitable device or system (e.g., in a look-up table). For example, the user may obtain access to an image by scanning a code at a location in the amusement park, and the image may be added to the user profile. Then, upon scanning a unique identifier or otherwise identifying themselves within the amusement park attraction, a control system may determine that the user has obtained the image (or otherwise possesses or is associated with the image). The control system may then apply disclosed techniques to create derivatives based on the image (e.g., using the context data). Indeed, any of the examples and embodiments disclosed herein with reference to NFTs may be used for any other images, motion profiles, and/or sound profiles (e.g., non-NFTs).

Figure 5:
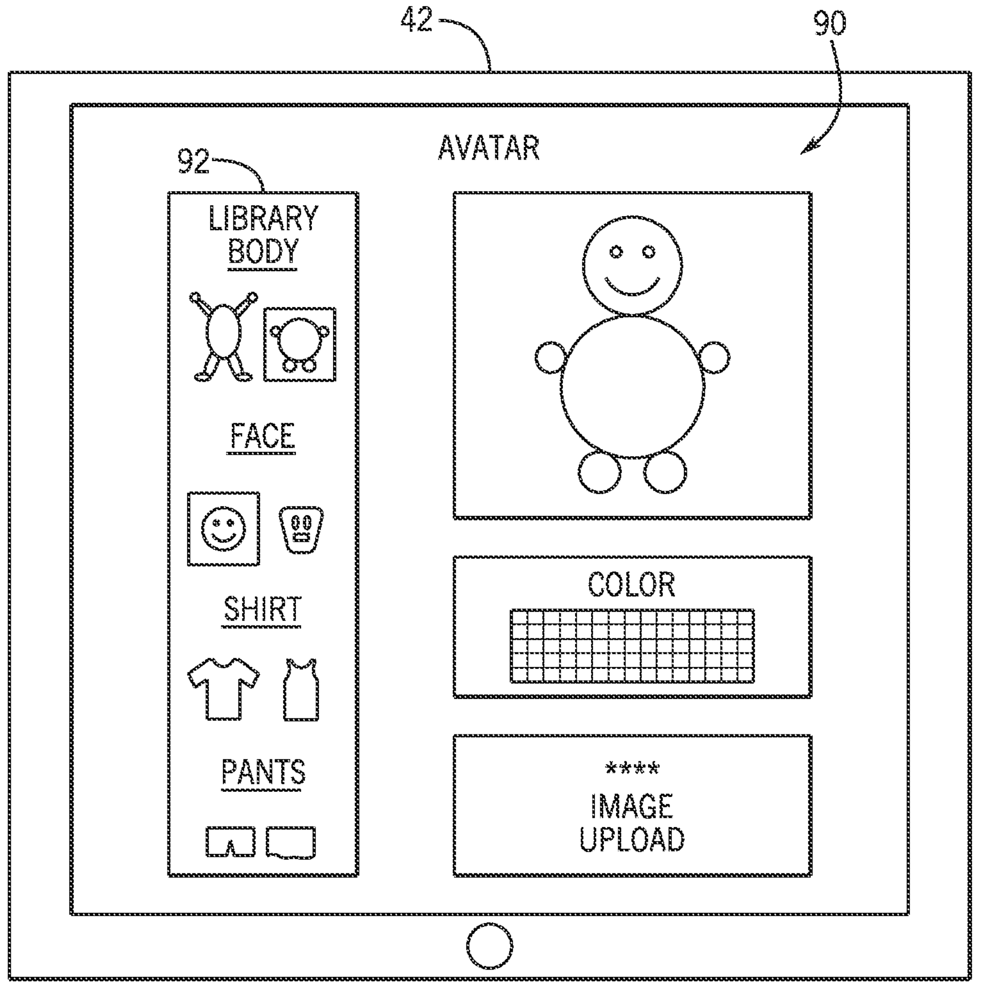
FIG. 5 illustrates a graphical user interface (GUI) on a display screen of a user device, wherein the GUI presents a library of elements that may be used to create avatars, in accordance with an aspect of the present disclosure.

As noted herein, each user may be associated with one or more avatars. In an embodiment, the user may provide inputs via an application (e.g., software application) on the user device to create the one or more avatars. With the foregoing in mind, FIG. 5 illustrates an embodiment of a graphical user interface (GUI) 90 that may be presented on a display screen, such as on the display screen of the user device 42. As shown, the GUI 90 includes a library of available elements 92 (e.g., heads, bodies, body parts, clothing, accessories, colors, textures, letters, numbers; style guide) that may be used to create the one or more avatars. In particular, the user may open the application to access the library of available elements 92, and then user may select from the library of available elements 92 to form a particular avatar. For example, the user may select a pink body, short blue hair, green eyes, and a blue dress to form the avatar. In an embodiment, the user may select objects (e.g., head, body, clothing) from the library of available elements 92, and also separately use a color palette or wheel to select a respective color for each object. The GUI 90 may include the library of available elements 92, including the color palette or wheel. Additionally, the GUI 90 may include a representation of the avatar, and the representation of the avatar may be updated in real-time (e.g., substantially real-time; following each selection of the element/object/color by the user) so that the user can visualize the avatar as the user builds the avatar with the application. In some embodiments, the avatar may be intended and/or designed to represent the user (e.g., each avatar represents a corresponding user/creator).

In an embodiment, the user may import one or more user-generated images (e.g., user-selected and/or user-imported images; taken, stored, and/or accessible to the user device 42) into the application, and the one or more user-generated images may be incorporated into the avatar. In an embodiment the one or more user-generated images may be manipulated (e.g., cropped, edited) in the application prior to being incorporated into the avatar. For example, the one or more user-generated images may include a photo of the user in front of a scene (e.g., another attraction in the amusement park, a city, a monument, with friends), and the user may upload the photo to add the photo to a front of a shirt worn by the avatar. Additionally or alternatively, the user-generated images may include a drawing created by the user (e.g., hand-drawn and scanned to create a digital file; digitally-created art), and the user may upload the drawing to add the drawing to a tool carried by the avatar. It should be appreciated that the user-generated images may include any user-selected and/or user-imported images (e.g., from a database/cloud storage) and are not necessarily created by the user (e.g., by the user operating the user device 42 to capture the photo and/or to draw the drawing), but may be separate or different from the available elements in the library. In an embodiment, the application (e.g., via the control system 24) applies a filter to the user-generated images to block use of inappropriate user-generated images (e.g., derogatory symbols or words). For example, the application may use text and/or image recognition techniques (e.g., template matching) to identify the inappropriate user-generated images, and then rejects or blocks the inappropriate user-generated images. The application may notify the user that the user-generated images are not permitted and/or suggest alternatives for use with the avatar.

The library of available elements 92 and/or the user-generated images may provide enough variations/permutations so that each avatar is unique. However, in an embodiment, the library of available elements 92 may be updated to remove elements from the library to cause each avatar to be unique. For example, one element present in each avatar may be removed from the library so as not to be available to guests for subsequent avatar creations (e.g., a shirt with a symbol of a red leaf is selected from the library of elements for the avatar, and then, the shirt is removed from the library). Additionally or alternatively, a unique feature may be added to each avatar to cause each avatar to be unique. For example, the application (e.g., via the control system 24)

may add a numerical indicator to the avatar (e.g., the shirt worn by the avatar), wherein the numerical indicator represents a number of otherwise identical avatars and/or serves to differentiate the otherwise identical avatars from one another. That is, the first time that a particular avatar (e.g., having a particular combination of elements) is created by one user, the number one may be added to the avatar. Then, the second time that the particular avatar (e.g., having the particular combination of elements) is created by another user, the number two may be added to the avatar to differentiate the otherwise identical avatars from one another. The numerical indicator may also provide feedback to the user about the uniqueness and/or potential value of the avatar (e.g., more unique avatars may have more value in the marketplace). In an embodiment, the application may alert the user that their avatar is identical to another user's avatar and may prompt and/or provide an opportunity for the user to change their avatar. At least some of the individual elements in the library of available elements 92 (e.g., all of the individual elements) may be NFTs. Additionally, as noted herein, once created, the avatar may be minted as an NFT. Thus, the avatar is composed of NFTs and may itself be minted as an NFT.

Certain elements (e.g., in the library of available elements 92) that form the avatars and/or the NFTs may include protected assets (e.g., an entity has ownership and/or legal rights in the elements that form the avatars and/or the NFTs). In an embodiment, the application and/or the interactive system 10 operate according to terms of a contract (e.g., between the entity and another entity that supports the application and/or the interactive system 10) that defines permitted uses of the protected assets. For example, the contract may permit use of a body of a well-known cartoon character that is one of the protected assets. Furthermore, the contract may permit use of the body of the well-known cartoon character to be incorporated into the avatar as long as the avatar only includes elements from the library and does not include any imported user-generated images. Thus, the application may enable the user to combine the body of the well-known cartoon character with the elements from the library, but may block combination with the user-generated images. Upon creation of the avatar in this way, the avatar may be minted as an NFT with validation (e.g., proof of authorization by the entity) of the NFT stored on the distributed ledger.

It should be appreciated that these techniques may enable dynamic revisions of rights and privileges across NFTs. For example, at some later time, the application and/or the interactive system 10 may operate according to different terms of another contract that defines permitted uses of the protected assets. The another contract may permit the body of the well-known cartoon character to be incorporated into the avatar as long as the avatar only includes a particular subset of the elements from the library and does not include any imported user-generated images. Thus, the application may enable the user to combine the body of the well-known cartoon character with the particular subset of the elements from the library, but may block combination with other elements from the library and the user-generated images. Upon creation of the avatar in this way, the avatar may be minted as an NFT with validation (e.g., proof of authorization by the entity) of the NFT stored on the distributed ledger. In this way, the NFTs may be efficiently created to include the protected assets and also automatically validated, even as the contract(s) that govern permitted use of the protected assets vary over time. This may assist with identification of validated NFTs, as earlier NFTs created under prior contract(s) may not align with or be permitted under current contract(s), but may be immutably recorded as validated in the distributed ledger. This may assist with use in the interactive system 10 (e.g., during a future visit by the user) and/or with transactions of the NFTs on the marketplace. Furthermore, this may assist partners (e.g., third-parties, other than the entity and the operator of the interactive system 10) to verify and identify validated NFTs for use in other ways, such as characters in at-home video entertainment consoles, other entertainment venues, or the like.

It should be appreciated that any features shown or described with reference to FIGS. 1-5 may be combined in any suitable manner. While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive system for an amusement park attraction, the interactive system comprising:
- one or more processors configured to:
  - identify a non-fungible token (NFT) image possessed by a user within the amusement park attraction;
  - transform the NFT image into a derivative image of the NFT image based on context data for the amusement park attraction, wherein the context data comprises attributes that are available to transform the NFT image into the derivative image of the NFT image, and the NFT image and the derivative image of the NFT image vary by at least one attribute; and
  - instruct output of the derivative image of the NFT image via an output device within the amusement park attraction.

2. The interactive system of claim 1, wherein the one or more processors is configured to identify the NFT image possessed by the user via communication with a user device carried by the user in the amusement park attraction.

3. The interactive system of claim 1, wherein the one or more processors are configured to randomly assign the attributes to transform the NFT image into the derivative image of the NFT image.

4. The interactive system of claim 1, wherein the one or more processors are configured to adjust a lighting effect, a sound effect, or both within the amusement park attraction based on characteristics of the derivative image of the NFT image.

5. The interactive system of claim 1, wherein the output device comprises a display screen, and the one or more processors are configured to:
- identify an additional NFT image possessed by an additional user within the amusement park attraction;

transform the additional NFT image into an additional derivative image of the additional NFT image based on the context data for the amusement park attraction; and instruct simultaneous display of the derivative image of the NFT image and the additional derivative image of the additional NFT image via the display screen within the amusement park attraction.

6. The interactive system of claim 1, wherein the one or more processors are configured to:

transform the NFT image into an additional derivative image of the NFT image based on the context data for the amusement park attraction, wherein the derivative image and the additional derivative image vary by at least one attribute; and instruct output of the additional derivative image of the NFT image via the output device within the amusement park attraction.

7. The interactive system of claim 1, wherein the one or more processors are configured to provide an NFT marketplace to facilitate transfer of the NFT image to another user.

8. The interactive system of claim 1, wherein the one or more processors are configured to direct the user to travel to a location to obtain the NFT image.

9. The interactive system of claim 1, wherein the output device comprises a display screen, and the one or more processors are configured to:

identify an avatar associated with the user; and instruct display of the avatar and the derivative image of the NFT image being worn or carried by the avatar on the display screen within the amusement park attraction.

10. The interactive system of claim 1, wherein the one or more processors are configured to:

provide a graphical user interface that includes a library of elements and enables the user to select elements from the library of elements to form an avatar; and mint the avatar as an NFT.

11. The interactive system of claim 1, wherein the context data comprises rules that set a respective rarity for a first attribute of the attributes that are available to transform the NFT image into the derivative image of the NFT image, and a respective rarity for a second attribute of the attributes that are available to transform the NFT image into the derivative image of the NFT image.

12. The interactive system of claim 11, wherein the first attribute of the attributes comprises a first color, and the second attribute of the attributes comprises a second color.

13. An interactive system for a plurality of amusement park attractions, the interactive system comprising:

one or more processors configured to:

identify a non-fungible token (NFT) possessed by a user, wherein the NFT comprises an image;

transform the NFT into a first derivative image of the NFT based on first context data for a first amusement park attraction of the plurality of amusement park attractions, wherein the first context data comprises a first set of attributes that are available to transform the NFT into the first derivative image of the NFT, and the NFT and the first derivative image of the NFT vary by at least one attribute of the first set of attributes; and transform the NFT into a second derivative image of the NFT based on second context data for a second amusement park attraction of the plurality of amusement park attractions, wherein the second context data comprises a second set of attributes that are available to transform the NFT into the second derivative image of the NFT, and the NFT and the second derivative image of the NFT vary by at least one attribute of the second set of attributes; and instruct display of the first derivative image of the NFT and the second derivative image of the NFT for visualization by the user.

14. The interactive system of claim 13, wherein the first derivative image corresponds to a respective theme of the first amusement park attraction, and the second derivative image corresponds to a respective theme of the second amusement park attraction.

15. A method of operating an interactive system for one or more amusement park attractions, the method comprising:

identifying, using one or more processors, a non-fungible token (NFT) possessed by a user, wherein the NFT comprises an image;

transforming, using the one or more processors, the NFT into a derivative image of the NFT based on first context data for a first amusement park attraction of the one or more amusement park attractions, wherein the first context data comprises attributes that are available to transform the NFT into the derivative image of the NFT, and the NFT and the derivative image of the NFT vary by at least one attribute; and instructing, using the one or more processors, display of the derivative image of the NFT on a first display screen within the first amusement park attraction of the one or more amusement park attractions.

16. The method of claim 15, wherein transforming the NFT into the derivative image comprises modifying a color of the NFT, modifying a shape of the NFT, adding an embellishment to the NFT, or any combination thereof.

17. The method of claim 15, comprising:

identifying, using the one or more processors, an additional NFT possessed by an additional user, wherein the additional NFT comprises an additional image;

transforming, using the one or more processors, the additional NFT into an additional derivative image of the additional NFT based on the first context data for the first amusement park attraction of the one or more amusement park attractions; and instructing, using the one or more processors, display of the derivative image of the NFT and the additional derivative image of the additional NFT together on the first display screen within the first the amusement park attraction of the one or more amusement park attractions.

18. The method of claim 15, comprising:

receiving, at the one or more processors, an image of the user within the first amusement park attraction of the one or more amusement park attraction; and instructing, using the one or more processors, display of the image of the user in association with the derivative image of the NFT on the first display screen within the first amusement park attraction of the one or more amusement park attractions.

19. The method of claim 15, comprising:

transforming, using the one or more processors, the NFT into a second derivative image of the NFT based on second context data for a second amusement park attraction of the one or more amusement park attractions, wherein the second context data comprises respective attributes that are available to transform the NFT into the second derivative image of the NFT, and the NFT and the second derivative image of the NFT vary by at least one attribute; and instructing, using the one or more processors, display of the second derivative image of the NFT on a second display screen within the second amusement park attraction of the one or more amusement park attractions.

20. The method of claim 19, wherein transforming the NFT into the derivative image comprises randomly applying a first set of rules established by the first context data, and transforming the NFT into the second derivative image comprises randomly applying a second set of rules established by the second context data, and the first set of rules and the second set of rules are different from one another.

* * * * *